Sept. 28, 1937.  I. I. SLOMON  2,094,220

ADHESIVE COMPOSITION

Filed Nov. 18, 1935

Inventor
Ira I. Slomon

By Robert F. Davis
Attorney

Patented Sept. 28, 1937

2,094,220

UNITED STATES PATENT OFFICE 2,094,220

ADHESIVE COMPOSITION

Ira I. Slomon, Hollis, N. Y.

Application November 18, 1935, Serial No. 50,461

5 Claims. (Cl. 134—23.6)

This invention relates to an adhesive composition and method of manufacturing the same, and more particularly to an improved adhesive of the type which is capable of separably uniting various objects.

It is well known that ordinary glues, pastes, and cements are adapted to form an essentially permanent bond between the objects or materials which are united thereby. Accordingly when materials are once joined by the commonly used types of adhesives, separation of the parts is rendered difficult, and when accomplished, in almost every instance the materials are definitely marred in appearance as a result. These characteristics of glue and similar cements are due to the fact that they display a great affinity for all objects or materials with which they come in contact while wet or moist, and quickly dry and create a strong bond, which cannot be broken without the undesirable results mentioned.

Owing to these important disadvantages of ordinary adhesives, it is common practice to avoid their use, whenever it is desired to obtain a temporary or separable union between objects or materials. For example, letters, papers, and correspondence are almost invariably clipped together instead of being pasted. There are many instances, however, where an adhesive must be employed in spite of its usual disadvantages, because there is no other way of causing the desired union.

Accordingly a principal object of the present invention is to produce a new adhesive material of sufficient strength to provide a good bond between the surfaces to be united but at the same time of such a nature that the surfaces may be easily and quickly separated without altering their appearance or otherwise causing damage thereto. The new adhesive composition which I have discovered is not only thoroughly capable of accomplishing the above results but also possesses an unusual amount of substantially permanent tackiness, so that the adhesive may be used continuously or repeatedly over an extended period of time without losing its adhesive properties. In use the adhesive is applied as a coating upon one surface and becomes permanently attached thereto in the same manner as an ordinary adhesive, such as glue. My adhesive differs, however, from ordinary adhesives, in that it forms a tacky layer, upon drying, and this tacky layer or coating is capable of adhesively uniting the surface or material to which it is applied to another surface or material without creating a permanent bond. In other words, the adhesive constituents, when once firmly attached to one surface, do not show any permanent affinity for any other surface.

These characteristics render the new adhesive suitable for a wide variety of purposes which up to the present have been out of the question. The adhesion or union of the parts will last indefinitely, and when it is desired to separate the materials this may be accomplished with ease, and the union and separation may be repeated as often as desired. In addition, the new adhesive is so constituted that it will not discolor the surfaces to which it is applied, nor will it cause shrinkage and therefore wrinkling of such materials as paper. Moreover it may be employed to join together in all possible combinations a wide variety of different materials, such as, paper, cardboard, glass, wood, cork, metals, fabrics, cellophane, tinsel, fringe, lacquer cording and other objects having a solid or semi-solid surface.

The invention broadly relates to an adhesive composition for the purpose specified comprising a mixture of two solutions, one of which is a solution of rubber or rubber-like material and the other a solution of a resinous material. The bulk of the adhesive comprises a solution of rubber while the second solution, which is employed in relatively small quantities, comprises a suitable solution of an ester gum or other similar resinous material.

The following is an example of a composition which I have found to make a very suitable adhesive for the purpose contemplated, together with the proportions and amounts employed.

Solution 1

| | |
|---|---|
| Milled crepe rubber | 1 lb. |
| Naphtha | 2½ gals. |

Solution 2

| | |
|---|---|
| Ester gum | 4 lbs. |
| Toluol | 25.6 ozs. |
| Ethyl acetate | 19.2 ozs. |
| Butyl acetate | 6.4 ozs. |

A relatively small portion of the solution of ester gum is added to a relatively large portion of the rubber solution. For example, a very suitable adhesive having all of the desired properties may be obtained by pouring from about 5 to 15 ozs. of the ester-gum solution into sufficient of the rubber solution to make a total yield of about one gallon (128 ozs.), and thoroughly mixing the resulting product. These amounts are preferred, as the ester gum solution, which tends to increase the tackiness of the final product, may produce too tacky a product, if too much is added, and if too little is employed, the advantageous characteristics of my invention may be partially sacrificed. The proportions may, however, be varied within reasonable limits, as it is sometimes desirable to diminish or increase the tacky state of the adhesive to conform with requirements under various working conditions.

It is to be understood that any other rubber material may be substituted for crepe rubber, such as, synthetic or reclaimed rubber. The rubber may also be either milled or unmilled, but better results have been obtained with milled rubber, the only advantage of unmilled rubber being its relative cheapness. The rubber may be colored or rendered white, and may have small quantities of whiting, zinc, carbon black, or the like, added thereto for coloring and other purposes.

Naphtha is a good example of a solvent for the rubber material and may be of any desired gravity. Any suitable solvent, however, may be employed, such as, carbon bisulphide, benzol, or carbon tetrachloride. When it is desired to render the adhesive non-inflammable, carbon tetrachloride or other solvent having fire extinguishing properties, is preferred.

The ester gum, which is obtained by reacting rosin with glycerine, is for several reasons the preferred resin for imparting to the rubber solution the desired properties. In the first place, it is light in color, and therefore does not affect the color of the finished adhesive. Secondly, it dissolves readily in my solution, and thirdly it gives uniform results owing to its synthetic derivation. A number of other synthetic and natural gums could be substituted, but most of these are dark in color, require dewaxing, and otherwise are lacking in the advantageous characteristics of the ester gum I employ.

The toluol constitutes a solvent for the ester gum, and can be employed in greater or less amounts according to the viscosity of final product desired. The ethyl and butyl acetates, on the other hand, act as diluents and are examples of relatively fast and slow volatiles respectively, the proportions of which may be varied to obtain a final product of varying degrees of tackiness. Equivalents of toluol may be added, and instead of the ethyl and butyl acetates, other esters, such as amyl acetates, secondary amyls, acetone, butone, ketones generally, alcohols, esters of the cellosolve group, otherwise known as the glycol ethers, and other solvent esters which are commonly used in the manufacture of lacquer, may be utilized. It has been found, however, that toluol is the most suitable solvent for the ester gum, and that the particular blend of ethyl and butyl acetates disclosed above is superior to other diluents, in that it produces the desired drying end point and in addition has a very satisfactory odor. By drying end point I refer to the state of tackiness of the adhesive after the adhesive has been applied and the normal evaporation of the solvents has taken place.

In preparing the composition the following procedure is preferably followed: The rubber material is placed in an iron churn and is covered with the solvent, such as naphtha, and allowed to remain therein overnight during which time it becomes thoroughly saturated. It is then agitated until a clear solution is formed. At the same time that the rubber is treated with a solvent, the ester-gum is powdered and brought into solution in the toluol, and is permitted to remain thirty-six to forty-eight hours in solution. Predetermined amounts of ethyl and butyl acetates are then added, and the materials are placed in a sealed barrel and permitted to remain therein without agitation until the ester gum is thoroughly dissolved. The barrel is rolled occasionally, however, to keep any sediment from forming at the bottom. Upon obtaining these two solutions i. e. the rubber solution and the ester gum solution, in the above manner, they are mixed, and this is preferably accomplished by pouring the ester gum solution into the rubber solution. The mixture is finally agitated so as to distribute the gum solution in the rubber solution, and the resulting material constitutes the adhesive composition which I have found to possess all of the desired characteristics.

It is preferable to add the ester gum solution to the rubber solution, because in this manner it is possible to obtain a thorough mixture, and the amount of tack and viscosity can be controlled at all times. Moreover it has been observed that unless the mixing is accomplished in this way, the ester gum solution tends to cling to the walls of the mixing chamber or the parts of the agitating device employed.

Some of the practical adaptations of the invention are illustrated in the accompanying drawing, of which Figure 1 represents a cotton ball to which a braided material is adhesively applied, the braided material being shown partially removed;

Figure 1:
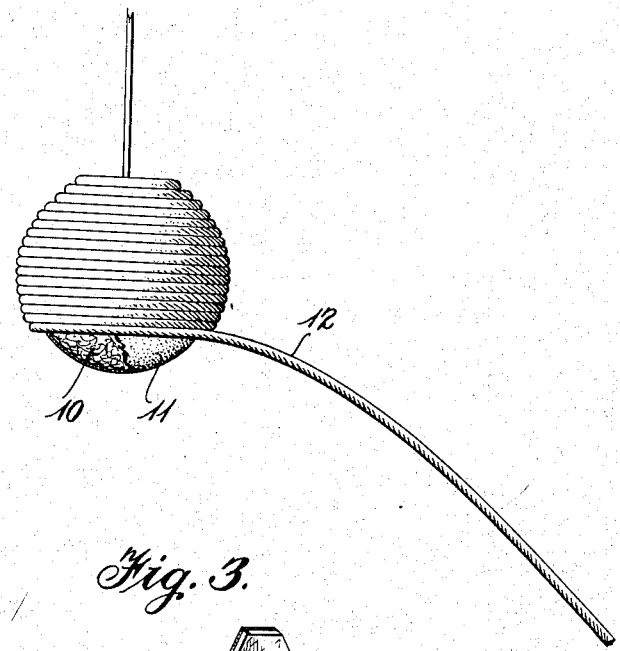

In Figure 1, an ornamental tassel for curtains or the like is shown, comprising a compressed cotton ball 10 having an exterior coating 11 of the special adhesive constituting the invention. The braid 12 is wrapped about ball 10 in the manner shown, and becomes adhesively united thereto upon contacting the tacky surface of the ball. When the adhesive described herein is employed, the braid may be readily removed for cleaning or exchanged for a new braid, and in any event the braid may be reused any number of times, as the adhesive remains intact on the surface of the cotton ball and does not stick to the braid.

Figure 2:
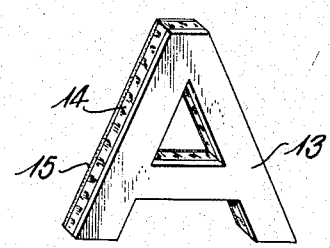
Figure 2 represents a metallic letter or number having a cork base, the back surface of which is adapted to receive the composition constituting the invention.

In Figure 2, 13 represents a metallic letter or the like having a cork base 14, the composite article being adapted for application to any surface, such as a door or window or display counter. The adhesive coating 15 in this case is applied to the back surface of the cork layer 14. Thus, a letter or word may be firmly but removably fastened to any supporting surface.

Figure 3:
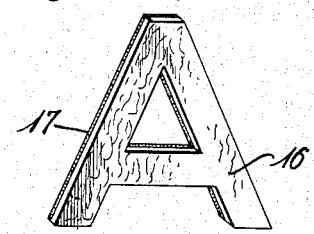
Figure 3 shows a similar letter or number made of cardboard.
Figure 4:
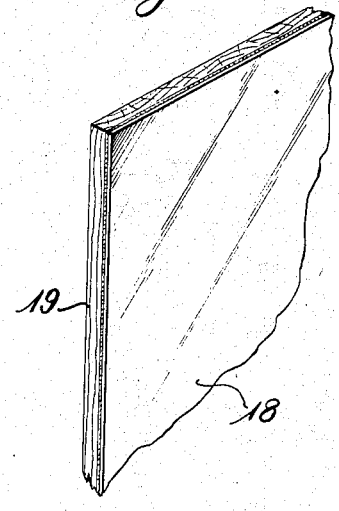
Figure 4 shows the adhesion of tinfoil on wood.

Figure 3 shows a similar letter made of a cardboard layer 16, to the back of which the adhesive coating 17 is applied. In Figure 4, a laminated construction is shown comprising a layer 18 of tinfoil and a layer 19 of wood. These layers are suitably united by my special adhesive composition, and thereby form a laminated material which is suitable for imitating metal under certain circumstances, such as, metallic configurations on windows or the like.

Figure 5:
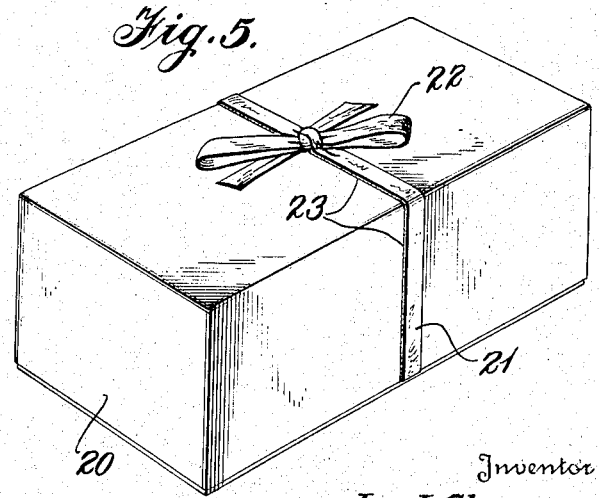
Figure 5 illustrates an ornamental box having an ornamental ribbon adhesively applied thereto.

Figure 5 illustrates an ornamental box 20, such as is used in the confectionery trade. A ribbon 21 having an ornamental bow 22 is adhesively united to box 20 by the adhesive material 23 of the type described herein.

The adhesive when applied to a surface of any material, imparts to that surface a tackiness which permits the material to be firmly yet removably united or attached any number of times to a surface or any other solid or semi-solid material. In addition to this, upon separation of the two surfaces or materials, all of the adhesive material remains on the surface upon which it was originally applied and none of it is taken up by the surface to which the coated material or surface is united. This most important attribute of the adhesive appears to be a result of the fact that it is capable of exerting a strong affinity for one material only, and, although it may retain its adhesive properties with regard to other materials, it does not have any permanent union with or attraction for these materials. It should be observed, however, that when both surfaces to be united are first treated with my adhesive, the resulting adhesion becomes positive, that is, the surfaces cannot be separated without material damage. It is, therefore, essential that the adhesive be permanently applied as a coating to one surface only.

It has been found that the adhesive composition constituting the invention has great affinity for any material to which it is applied, but when this material comes in contact with another surface or material, the adhesive exerts no permanent affinity for the second material, but creates an adhesive union between the materials which is relatively strong yet the materials may be separated with relative ease and without leaving blemishes or marks on the untreated material.

The adhesive solution may be applied to the various surfaces or materials to be treated by any suitable method, such as dipping, coating, spraying and the like, after which the solution is permitted to dry to a state of extreme tackiness. The adhesive may also be applied to either of the two surfaces which are to be united. For example, it may be applied either to the ball or the braid shown in Figure 1, or to the box or the ribbon shown in Figure 5.

It will be understood that the various applications of the invention illustrated in the drawing are merely exemplary, as many other uses and applications of the invention will become apparent to those skilled in the art. Also the amounts of the ingredients given in the example may be varied somewhat without detracting from the desirable attributes of the final product, although the amounts and proportions disclosed have been found to yield an excellent adhesive for the purposes contemplated.

The invention is entitled to a reasonable range of equivalents, and should be given as broad a construction as is commensurate with its teachings and spirit.

I claim:

1. An adhesive composition comprising a mixture of a rubber solution, a solution of an ester gum, and a diluent comprising ethyl and butyl acetates.

2. An adhesive composition comprising a mixture of about 113 to 123 ounces of a rubber solution with about 5 to 15 ounces of a solution of ester gum, the rubber solution consisting of about 1 pound of milled crepe rubber in 2½ gals. of naphtha, and the ester gum solution consisting of substantially 4 pounds of ester gum in 25.6 ounces of toluol, 19.2 ounces of ethyl acetate, and 6.4 ounces of butyl acetate.

3. A process for controlling the tackiness of a rubber-ester gum adhesive composition comprising incorporating therein a mixture of ethyl acetate and butyl acetate.

4. A process for controlling the tackiness of a rubber-ester gum adhesive composition comprising combining dissolved rubber with a dissolved ester gum in the presence of ethyl acetate and butyl acetate.

5. An adhesive composition comprising a rubber solution, a solution of an ester gum, and a tackiness controlling diluent consisting of ethyl acetate and butyl acetate.

IRA I. SLOMON.